(12) United States Patent
Kawano et al.

(10) Patent No.: US 11,513,768 B2
(45) Date of Patent: Nov. 29, 2022

(54) INFORMATION PROCESSING DEVICE AND INFORMATION PROCESSING METHOD

(71) Applicant: Sony Group Corporation, Tokyo (JP)

(72) Inventors: Shinichi Kawano, Tokyo (JP); Ryouhei Yasuda, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/290,775

(22) PCT Filed: Sep. 27, 2019

(86) PCT No.: PCT/JP2019/038071
§ 371 (c)(1),
(2) Date: May 3, 2021

(87) PCT Pub. No.: WO2020/116001
PCT Pub. Date: Jun. 11, 2020

(65) Prior Publication Data
US 2021/0382685 A1    Dec. 9, 2021

(30) Foreign Application Priority Data

Dec. 3, 2018 (JP) .............................. JP2018-226604

(51) Int. Cl.
*G06F 3/01*     (2006.01)
*G06F 3/0484*    (2022.01)
(Continued)

(52) U.S. Cl.
CPC .............. *G06F 3/167* (2013.01); *G06F 3/013* (2013.01); *G06F 3/0481* (2013.01); *G06F 3/04842* (2013.01); *G06F 2203/04806* (2013.01)

(58) Field of Classification Search
None
See application file for complete search history.

(56) References Cited

U.S. PATENT DOCUMENTS 10,025,772 B2 * 7/2018 Yamano ................. G06F 40/274
10,909,308 B2 * 2/2021 Imoto ................... G06F 3/0482
(Continued)

FOREIGN PATENT DOCUMENTS

JP    2000-194532 A    7/2000
JP    2005-222103 A    8/2005
(Continued)

OTHER PUBLICATIONS

International Search Report and Written Opinion dated Nov. 5, 2019, received for PCT Application No. PCT/JP2019/038071, Filed on Sep. 27, 2019, 10 pages including English Translation.

*Primary Examiner* — Jordany Nunez
(74) *Attorney, Agent, or Firm* — Xsensus LLP

(57) ABSTRACT

An information processing device including a specifying unit configured to, based on a speech of a user, specify a selected spot that is intended by the user from visual information that is displayed, wherein the specifying unit is configured to specify the selected spot based on a non-verbal action and a verbal action of the user, is provided. Furthermore, an information processing method including, by a processor, based on a speech of a user, specifying a selected spot that is intended by the user from visual information that is displayed, wherein the specifying includes specifying the selected spot based on a non-verbal action and a verbal action of the user, is provided.

15 Claims, 18 Drawing Sheets

(51) Int. Cl.
*G06F 3/0482* (2013.01)
*G06F 3/16* (2006.01)
*G06F 3/04842* (2022.01)
*G06F 3/0481* (2022.01)

(56) References Cited

U.S. PATENT DOCUMENTS

| | | | | |
|---|---|---|---|---|
| 2013/0060872 | A1* | 3/2013 | Wang | H04L 51/52 |
| | | | | 709/204 |
| 2013/0307771 | A1* | 11/2013 | Parker | G06F 3/167 |
| | | | | 345/158 |
| 2014/0337740 | A1 | 11/2014 | Kwon et al. | |
| 2014/0380230 | A1* | 12/2014 | Venable | G06F 3/013 |
| | | | | 715/781 |
| 2016/0189708 | A1* | 6/2016 | Dides | G10L 15/08 |
| | | | | 704/251 |
| 2016/0328372 | A1* | 11/2016 | Imoto | G06F 3/0482 |
| 2017/0031652 | A1* | 2/2017 | Kam | G06F 3/167 |
| 2017/0243600 | A1* | 8/2017 | Teshima | G10L 25/51 |
| 2018/0307303 | A1* | 10/2018 | Powderly | G06F 3/013 |
| 2019/0041985 | A1* | 2/2019 | Imoto | G06F 3/012 |
| 2019/0101979 | A1* | 4/2019 | Zhang | G02B 27/0172 |
| 2019/0324529 | A1* | 10/2019 | Stellmach | G06F 3/013 |

FOREIGN PATENT DOCUMENTS

| | | | |
|---|---|---|---|
| JP | 2008-225794 | A | 9/2008 |
| JP | 2016-218868 | A | 12/2016 |
| JP | 2017-174198 | A | 9/2017 |
| JP | 2018-515817 | A | 6/2018 |

\* cited by examiner

INFORMATION PROCESSING DEVICE AND INFORMATION PROCESSING METHOD

CROSS-REFERENCE TO RELATED APPLICATIONS

The present application is based on PCT filing PCT/JP2019/038071, filed Sep. 27, 2019, which claims priority to JP 2018-226604, filed Dec. 3, 2018, the entire contents of each are incorporated herein by reference.

FIELD

The present disclosure relates to an information processing device and an information processing method.

BACKGROUND

In recent years, techniques to input characters and choose information that is displayed without depending on an input device, such as a keyboard or a mouse, have been in development. For example, in Patent Literature 1, a technique to convert a speech of a user into a character string by a sound recognition technique and specify a position in which the character string is to be edited based on a gaze of the user is disclosed.

CITATION LIST

Patent Literature

Patent Literature 1: JP 2005-222103 A

SUMMARY

Technical Problem

To specify a position in which a character string is to be edited by the technique described in Patent Literature 1, however, significantly high gaze recognition accuracy is required. Furthermore, there is a possibility that the editing position will be changed frequently due to instability in gaze, etc.

Solution to Problem

According to the present disclosure, an information processing device is provided that includes: a specifying unit configured to, based on a speech of a user, specify a selected spot that is intended by the user from visual information that is displayed, wherein the specifying unit is configured to specify the selected spot based on a non-verbal action and a verbal action of the user.

Moreover, according to the present disclosure, an information processing method is provided that includes: by a processor, based on a speech of a user, specifying a selected spot that is intended by the user from visual information that is displayed, wherein the specifying includes specifying the selected spot based on a non-verbal action and a verbal action of the user.

DESCRIPTION OF EMBODIMENTS

Preferable embodiments of the disclosure will be described in detail below with reference to the accompanying drawings. In the specification and the drawings, the same components having substantially the same functional configuration are denoted with the same reference number and thus redundant description is omitted.

The description will be given in the following order.
1. Embodiment
   1.1. Overview
   1.2. Example of System Configuration
   1.3. Example of Functional Configuration of Information Processing Terminal Device 10
   1.4. Example of Functional Configuration of Information Processing Server 20
   1.5. Details of Functions
   1.6. Flow of Process
2. Example of Hardware Configuration
3. Summary

1. First Embodiment

1.1. Overview

First of all, an overview of an embodiment of the disclosure will be described. As described above, in recent years, input units and selection units without use of an input device, such as a keyboard or a mouse, have been in development. For example, in Patent Literature 1, a technique to specify a position in which character strings are to be edited based on a gaze of a user is described.

When specifying a position in which character strings that are displayed in a normal size are to be edited by a gaze recognition technique with a general performance, however, it is significantly difficult to specify the editing position in the unit of level of character.

It is difficult for a human to keep gazing at one point and thus instability occur in the gaze of the user generally. For this reason, with the technique described in Patent Literature 1, there is a possibility that the editing positon will be changed frequently according to instability in gaze.

The embodiment of the disclosure thus resolves such an aspect as that described above by taking a resolution that relates to recognition into consideration. The resolution according to the embodiment indicates the unit of the minimum area that a system is able to recognize based on the gaze, etc., and contains an area in which the gaze of the user who is to specify a point, or the like, may be instable.

Figure 1:
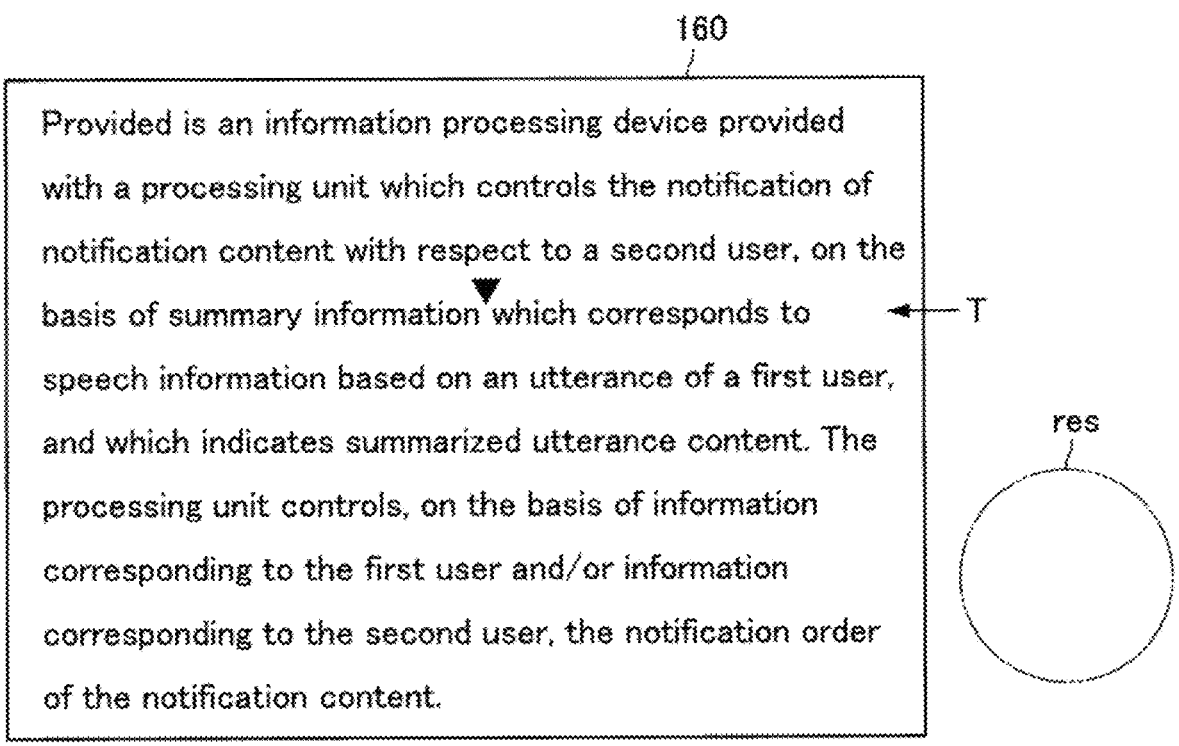
FIG. 1 is a diagram for explaining a resolution according to an embodiment of the disclosure.

FIG. 1 is a diagram for explaining a resolution according to the embodiment. In FIG. 1, a text T that is displayed on a display unit 160 of an information processing terminal device 10 is illustrated. The case where a user is to select a spot (between information and which) that is indicated by the descending black triangle from the text T is assumed here.

When the minimum area that is recognizable by the system or the area where a gaze, or the like, can be instable has a size approximate to that of the area that is represented by the chain double-dashed line on the lower right in the drawing, it is impossible to uniquely specify the spot that is indicated by the black triangle (referred to as selected spot below). In the embodiment, the area that is represented by the chain double-dashed line in the drawing is defined as a resolution res. Note that, in the following drawing, the sign of the resolution res is omitted in order to avoid overlapping of characters with the text T.

As described above, from the viewpoint of resolution, it is significantly difficult to specify a selected spot based on only a gaze of the user.

The technical idea according to the embodiment of the disclosure was made with the above-described aspect being focused on and it is possible to more accurately specify a selected spot that the user intends. For this reason, the information processing terminal device 10 according to the embodiment of the disclosure includes a specifying unit 140 that specifies a selected spot that the user intends from displayed visual information based on a speech and a behavior of the user. The specifying unit 140 has a characteristic in specifying the selected spot based on a non-verbal action and a verbal action of the user.

The aforementioned verbal action denotes general actions to send out a verbal intention in communication. For this reason, the verbal action according to the embodiment is, for example, represented by speech. On the other hand, the verbal action according to the embodiment is not necessarily limited to voiced actions and, for example, can contain motions of lips or silent whispering.

The aforementioned non-verbal action widely covers actions other than verbal actions taken by the user. The non-verbal action according to the embodiment, for example, may contain ocular motions, moves and shapes of fingers or hands, and moves and the orientation of the head. In other words, the specifying unit according to the embodiment of the disclosure may specify a selected spot based on a gaze or a gesture of the user, or the like.

Figure 2A:
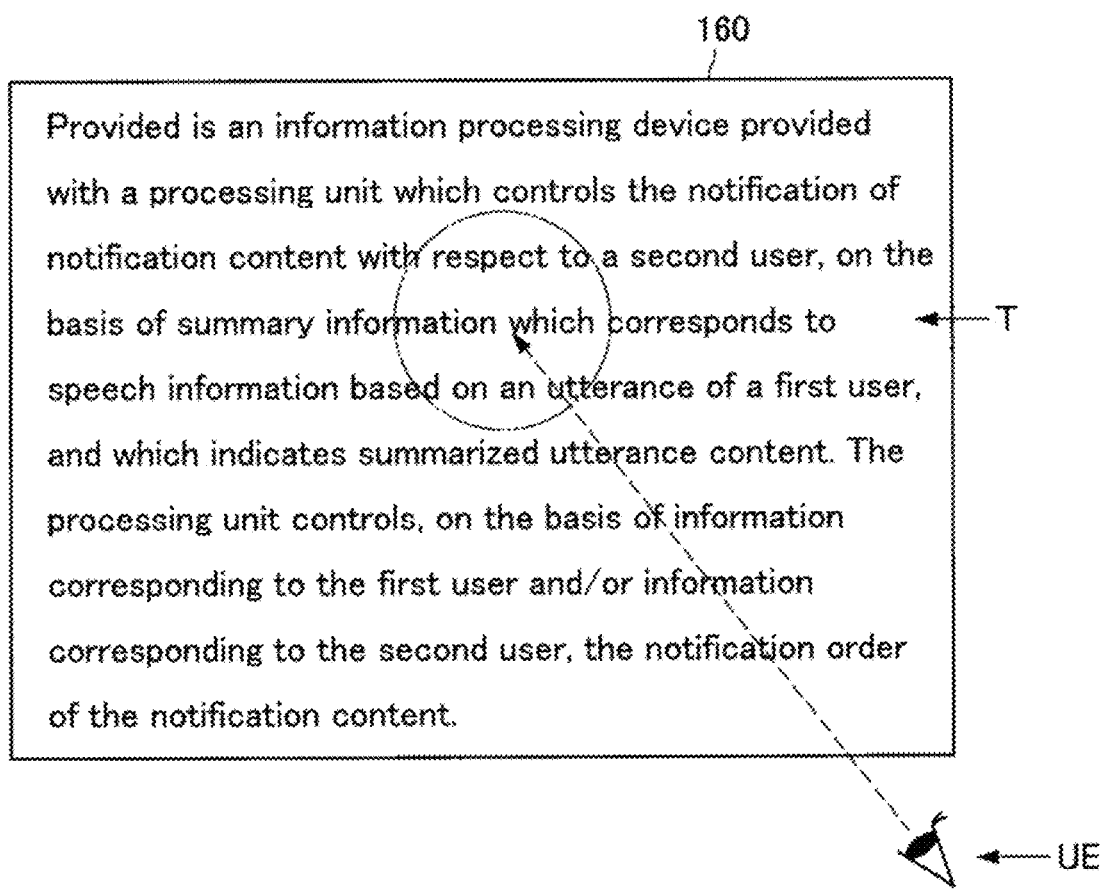
FIG. 2A is a diagram for explaining an overview of the embodiment.
Figure 2B:
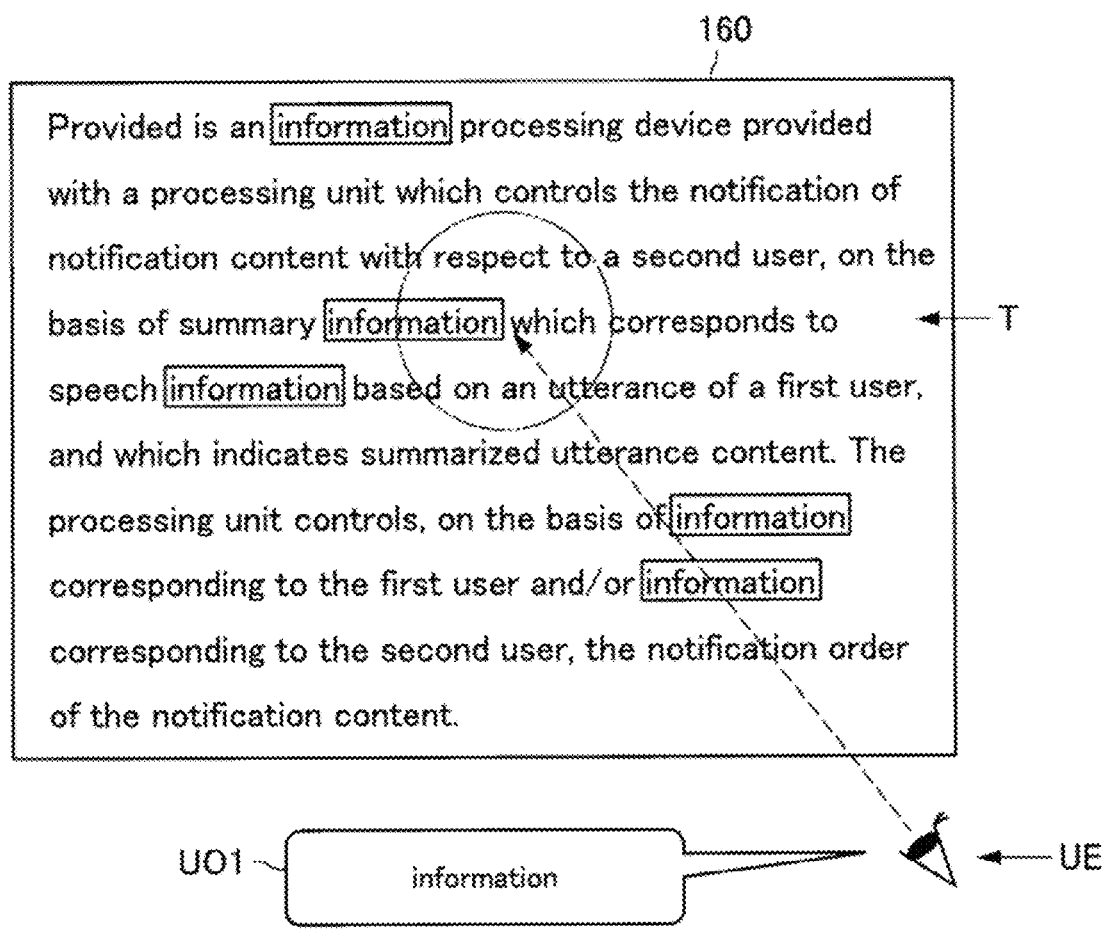
FIG. 2B is a diagram for explaining the overview of the same embodiment.
Figure 2C:
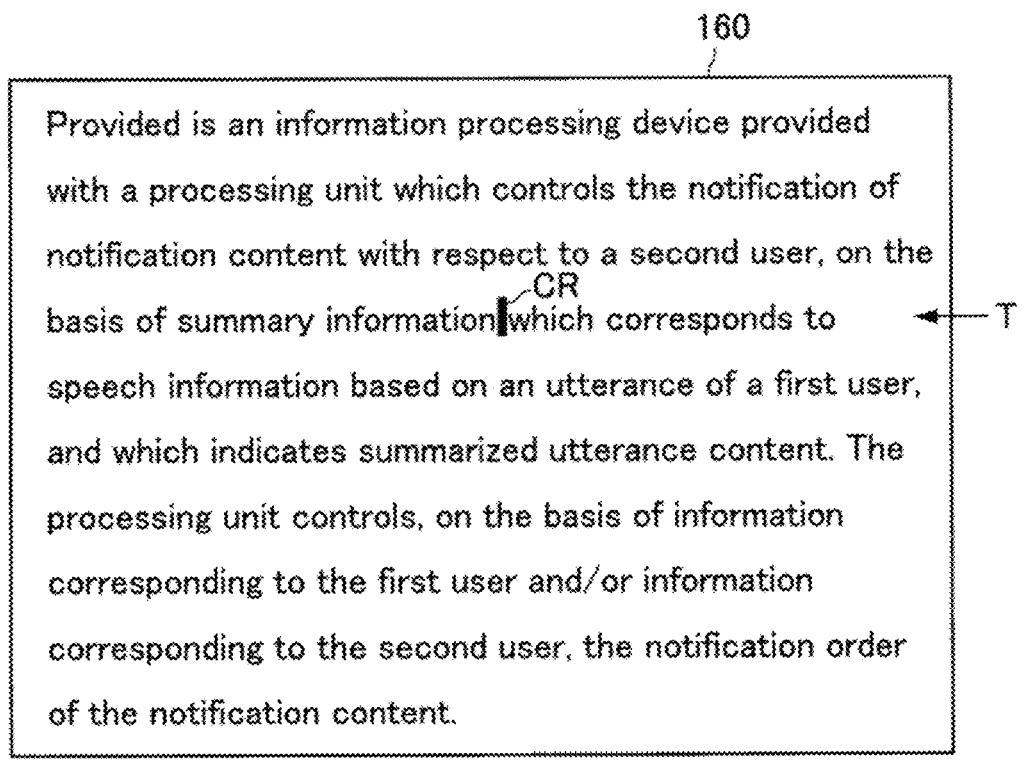
FIG. 2C is a diagram for explaining the overview of the same embodiment.

FIGS. 2A to 2C are diagrams for explaining the overview of the embodiment of the disclosure. The case where the specifying unit 140 according to the embodiment specifies a selected spot from character strings based on a gaze of and a speech of a user is exemplified and described below. As described above, the visual information according to the embodiment contains character strings. In FIGS. 2A to 2C, an eyeball UE of and a gaze of the user are schematically illustrated.

First of all, as illustrated in FIG. 2A, the user gazes an intended selected spot in the text T that is displayed on the display unit 160. In FIG. 2A, although illustration is omitted, the above-described selected spot may be the same selected spot illustrated in FIG. 1, that is, between information and which.

It is here however not possible to uniquely specify the above-described selected spot only by a gaze because the resolution is larger than the unit of level of character and thus the specifying unit 140 first of all selects, as a candidate spot, a gazed area (in other words, the area represented by the chain double-dashed line) that is determined based on a gaze of the user and the resolution. The gazed area may be presented to the user, for example, by enhanced display.

As illustrated in FIG. 2B, the user then makes a speech UO1 for assisting the specifying unit 140 in specifying a selected spot. The user makes a speech of "information" corresponding to a word right before the selected spot here.

Five character strings of "information" are here contained in the text T and, in the example illustrated in FIG. 2B, the character string that overlaps with the candidate spot is only "information" in the fourth line.

From this, the specifying unit 140 according to the embodiment is able to specify the spot right after "information" in the fourth line from among the five sets of "information" that are acquired by the search as illustrated in FIG. 2C. More specifically, the specifying unit 140 according to the embodiment is able to specify the above-described selected spot by matching between the character string contained in the candidate spot and the character string that is recognized from the speech UO1 of the user. In FIG. 2C, a caret CR that is displayed because the specifying unit 140 specifies the above-described spot as the selected spot is illustrated.

The overview of the embodiment has been described. As described above, according to the specifying unit 140 according to the embodiment, using both results of recognition of a verbal action and a non-verbal action enables the user to stepwise narrow down and accurately specify the selected spot that that user intends.

In the above description, the case where the specifying unit 140 defines a single candidate spot from character strings based on a gaze of the user and, based on a speech of the user, specifies a selected spot from the candidate spot is exemplified and described.

The flow of specifying a selected spot according to the embodiment is however not limited thereto. The specifying unit 140 according to the embodiment may define a candidate spot from visual information based on any one of a gaze and a speech of the user and, based on the other, specify a selected spot from the candidate spot.

In other words, the specifying unit 140 according to the embodiment is able to define multiple candidate spots from visual information based on a speech of the user and, based on a gaze of the user, specify a selected spot from the multiple selected spots.

In this case, the user is able to, first of all, as illustrated in FIG. 2A, search for a word of "information", or the like, by a speech and specify, by a gaze, a selected spot to be edited from multiple sets of "information" that are displayed in an enhanced manner. The process like that described above is particularly effective when the user cannot specify an intended editing position on his/her own.

In the above description, the case where the non-verbal action according to the embodiment is ocular motions and the verbal action is a speech has been described; however, the specifying unit 140, for example, is also able to specify a selected spot based on a character string and an intention that are recognized from a gesture, such as pointing by finger, and motions of the lips. As described above, the combination of the non-verbal action and the verbal action according to the embodiment can be changed freely.

1.2. Example of Configuration of System

Figure 3:
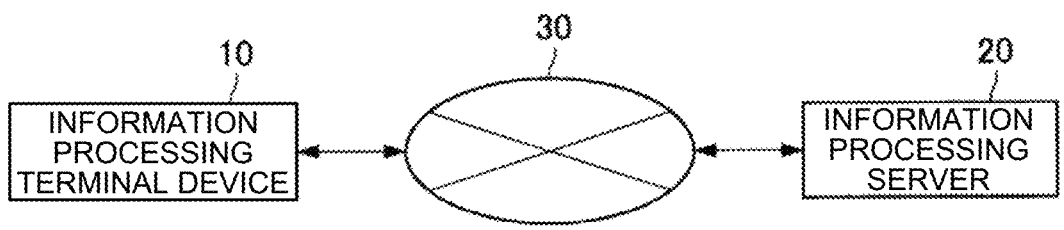
FIG. 3 is a block diagram illustrating an example of a configuration of an information processing system according to the embodiment.

An example of a configuration of an information system according to the embodiment will be described. FIG. 3 is a block diagram illustrating an example of a configuration of an information processing system according to the embodiment. As illustrated in FIG. 3, the information processing system according to the embodiment includes the information processing terminal device 10 and an information processing server 20. The information processing terminal device 10 and the information processing server 20 are connected with each other via a network 30 such that they can communicate with each other.

Information Processing Terminal Device 10

The information processing terminal device 10 according to the embodiment is an information processing device that specifies a selected spot that is intended by a user from visual information based on a non-verbal action and a verbal action of the user. The information processing terminal device 10 according to the embodiment may be, for example, a head-mounted display, a digital signage terminal device, or a dedicated device that is capable of acquiring images of the eyeballs of the user.

Information Processing Server 20

The information processing server 20 according to the embodiment is an information processing device that performs various recognition processes based on sensing information that is collected by the information processing terminal device 10. For example, the information processing server 20 according to the embodiment executes a gaze recognition process based on images of the eyeballs of the user that are captured by the information processing terminal device 10. The information processing server 20 according to the embodiment executes an sound recognition process and a natural language understanding process based on voice of the user that is collected by the information processing terminal device 10. The types of recognition processes to be performed by the information processing server 20 according to the embodiment are designed according to non-verbal actions and verbal actions to be used.

Network 30

The network 30 has a function of connecting the information processing terminal device 10 and the information processing server 20 to each other. The network 30 may contain a public network, such as the Internet, a telephone network or a satellite network, and various types of LAN (Local Area Network) including Ethernet (trademark), and a WAN (Wide Area Network). The network 30 may contain a dedicated network, such as an IP-VPN (Internet Protocol-Virtual Private Network). The network 30 may contain a wireless communication network, such as Wi-Fi (trademark) or Bluetooth (trademark).

The example of the configuration of the information processing system according to the embodiment has been described. The above-described configuration that is described, using FIG. 3, is an example only and the configuration of the information processing system according to the embodiment is not limited to the example. For example, the functions of the information processing terminal device 10 and the information processing server 20 may be implemented by a single device or may be implemented by three or more devices. The configuration of the information processing system according to the embodiment is modifiable flexibly according to the specification and operations.

1.3. Example of Functional Configuration of Information Processing Terminal Device 10

Figure 4:
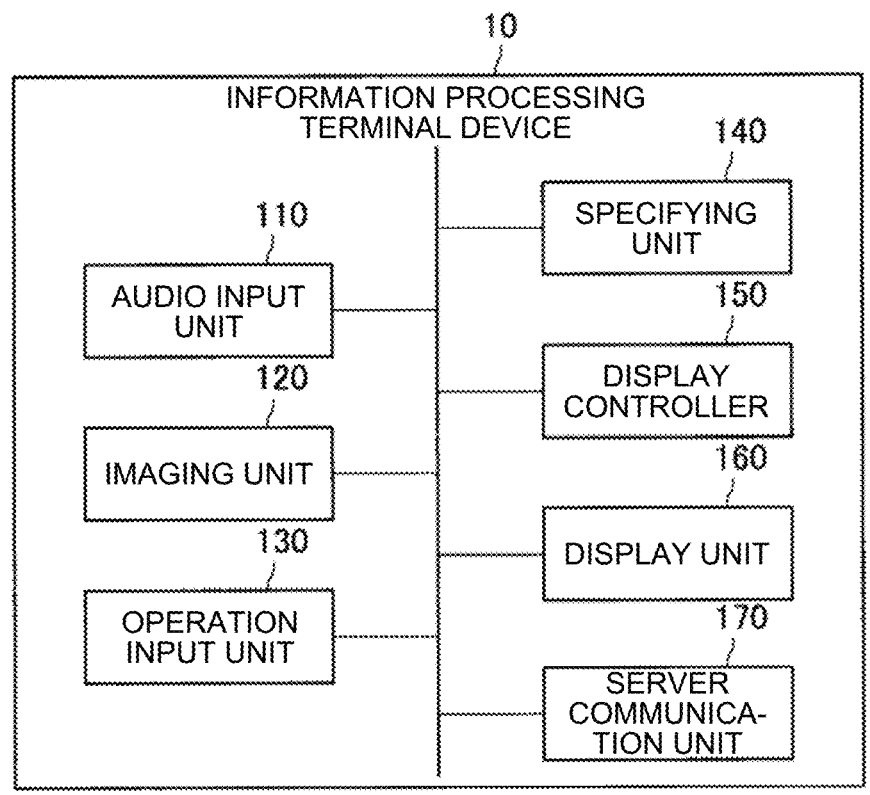
FIG. 4 is a block diagram illustrating an example of a functional configuration of an information processing terminal device according to the embodiment.

An example of a functional configuration of the information processing terminal device 10 according to the embodiment will be described next. FIG. 4 is a block diagram illustrating the example of the functional configuration of the information processing terminal device 10 according to the embodiment. As illustrated in FIG. 4, the functional configuration of the information processing terminal device 10 according to the embodiment includes an audio input unit 110, an imaging unit 120, an operation input unit 130, the specifying unit 140, a display controller 150, the display unit 160, and a server communication unit 170.

Audio Input Unit 110

The audio input unit 110 according to the embodiment collects sound, such a speech of the user. The audio input unit 110 according to the embodiment thus includes a sound collecting device, such as a microphone.

Audio Input Unit 110

The imaging unit 120 according to the embodiment captures images of the eyeballs of the user, or the like. The imaging unit 120 according to the embodiment thus includes an imaging sensor. The imaging unit 120 according to the embodiment may include a light source, such as an infrared LED, in order to capture images that are used to recognize a gaze of the user.

Operation Input Unit 130

The operation input unit 130 according to the embodiment detects an operation input made by the user. The operation input unit 130 according to the embodiment thus includes, for example, a touch panel, a switch, and a button.

Specifying Unit 140

The specifying unit 140 according to the embodiment specifies, based on a speech and a behavior, a selected spot that is intended by the user from the visual information that is displayed by the display unit 160. The specifying unit 140 according to the embodiment here has a characteristic in specifying a selected spot based on a non-verbal action and a verbal action of the user.

For example, as described above, the specifying unit 140 according to the embodiment may define a single candidate spot from visual information based on a gaze of the user and specify a selected spot from the candidate spot based on a speech of the user.

The specifying unit 140 according to the embodiment here is able to specify a selected spot from the candidate spot based on a character string or an intention that is recognized from a speech of the user.

Display Controller 150

The display controller 150 according to the embodiment controls display of visual information by the display unit 160. The visual information according to the embodiment, for example, contains character strings, images, or various types of waveform data. Details of the function of the display controller 150 according to the embodiment will be described separately below.

Display Unit 160

The display unit 160 according to the embodiment displays the visual information based on the control of the display controller 150. The display unit 160 according to the embodiment thus includes various displays.

Server Communication Unit 170

The server communication unit 170 according to the embodiment performs information communication with the information processing server 20 via the network 30. For example, the server communication unit 170 according to the embodiment transmits audio information on sound that is collected by the audio input unit 110 and image information that is obtained by the imaging unit 120 by image capturing to the information processing server 20, and receives a recognition process result.

The example of the functional configuration of the information processing terminal device 10 according to the embodiment has been described. The above-described configuration described, using FIG. 4, is an example only and the functional configuration of the information processing terminal device 10 according to the embodiment is not limited to the example. For example, the functions of the specifying unit 140 and the display controller 150 described above may be included as a function of the information processing server 20. The functional configuration of the information processing terminal device 10 according to the embodiment is flexibly modifiable according to the specification and operations.

1.4. Example of Functional Configuration of Information Processing Server 20

Figure 5:
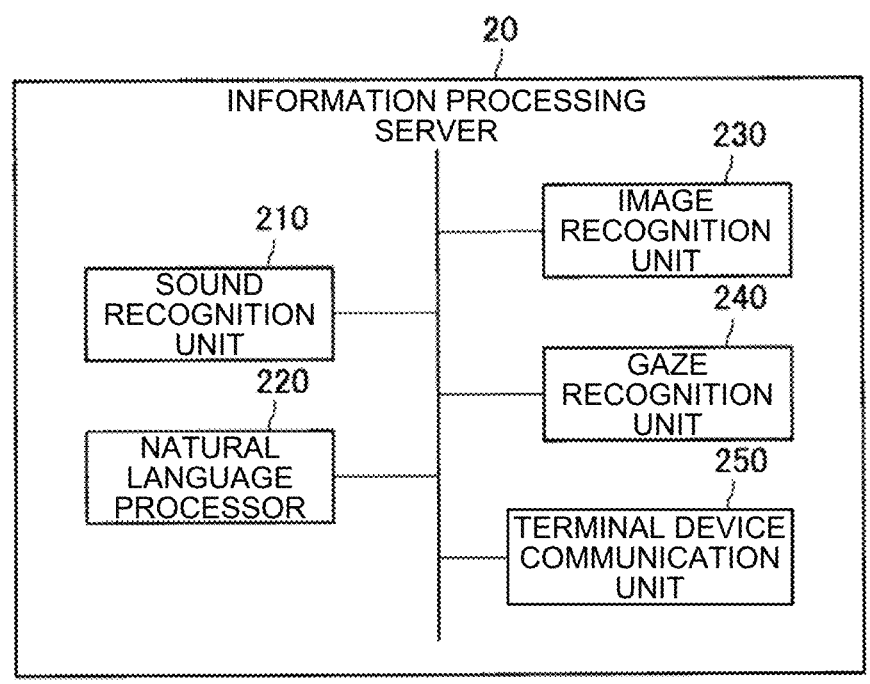
FIG. 5 is a block diagram illustrating an example of a functional configuration of an information processing server d according to the embodiment.

An example of a functional configuration of the information processing server 20 according to the embodiment will be described. FIG. 5 is a block diagram illustrating the example of the functional configuration of the information processing server 20 according to the embodiment. As illustrated in FIG. 5, the information processing server 20 according to the embodiment includes a sound recognition unit 210, a natural language processor 220, a gaze recognition unit 240, and a terminal device communication unit 250.

Sound Recognition Unit 210

The sound recognition unit 210 according to the embodiment performs automatic speech recognition (ARS) based on audio information on a speech of the user that is collected by the information processing terminal device 10 and convers the speech into a character string. The sound recognition unit 210 may perform sound recognition by a known technique.

Natural Language Processor 220

The natural language processor 220 according to the embodiment performs a natural language understanding (NLU) process based on the character string that is generated by the sound recognition unit 210 and extracts the intention of the speech of the user. The natural language processor 220 may perform the natural language understanding process by a known technique.

Image Recognition Unit 230

An image recognition unit 230 according to the embodiment recognizes various objects and text in an image. The image recognition unit 230 according to the embodiment may recognize an object by a known general object recognition technique.

Gaze Recognition Unit

The gaze recognition unit 240 according to the embodiment recognizes a gaze position of the user based on the images of the eyes of the user that are captured by the information processing terminal device 10. The gaze recognition unit 240 according to the embodiment may perform gaze recognition by a known technique.

Terminal Device Communication Unit 250

The terminal device communication unit 250 according to the embodiment performs information communication with the information processing terminal device 10 via the network 30. For example, the terminal device communication unit 250 according to the embodiment receives the audio information and the image information from the information processing terminal device 10 and transmits the result of the process by each of the above-described configurations to the information processing terminal device 10.

The example of the functional configuration of the information processing server 20 according to the embodiment of the disclosure has been escribed. Note that the above-described configuration described, using FIG. 5, is an example only and the functional configuration of the information processing server 20 according to the embodiment is not limited to the example. The function of the information processing server 20 according to the embodiment may be designed according to a non-verbal action and a verbal action to be recognized. The functional configuration of the information processing server 20 according to the embodiment is flexibly modifiable according to the specification and operations.

1.5. Details of Function

The function of the information processing terminal device 10 according to the embodiment will be described in detail next. As described above, the specifying unit 140 according to the embodiment, for example, is able to define a candidate spot based on a gaze of the user and specify a selected spot from the candidate spot based on a speech of the user.

Figure 6A:
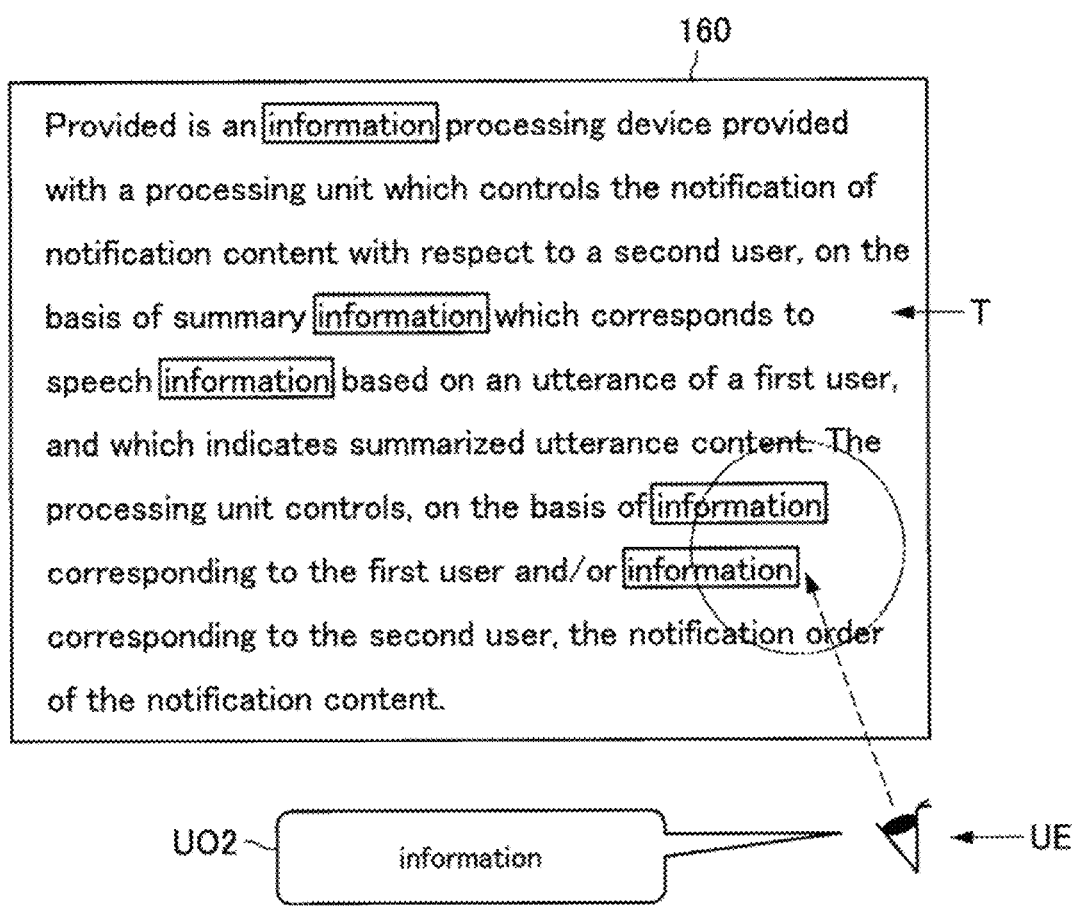
FIG. 6A is a diagram for explaining specifying a selected spot in the case where multiple subject character strings are contained in a candidate spot according to the embodiment.
Figure 6B:
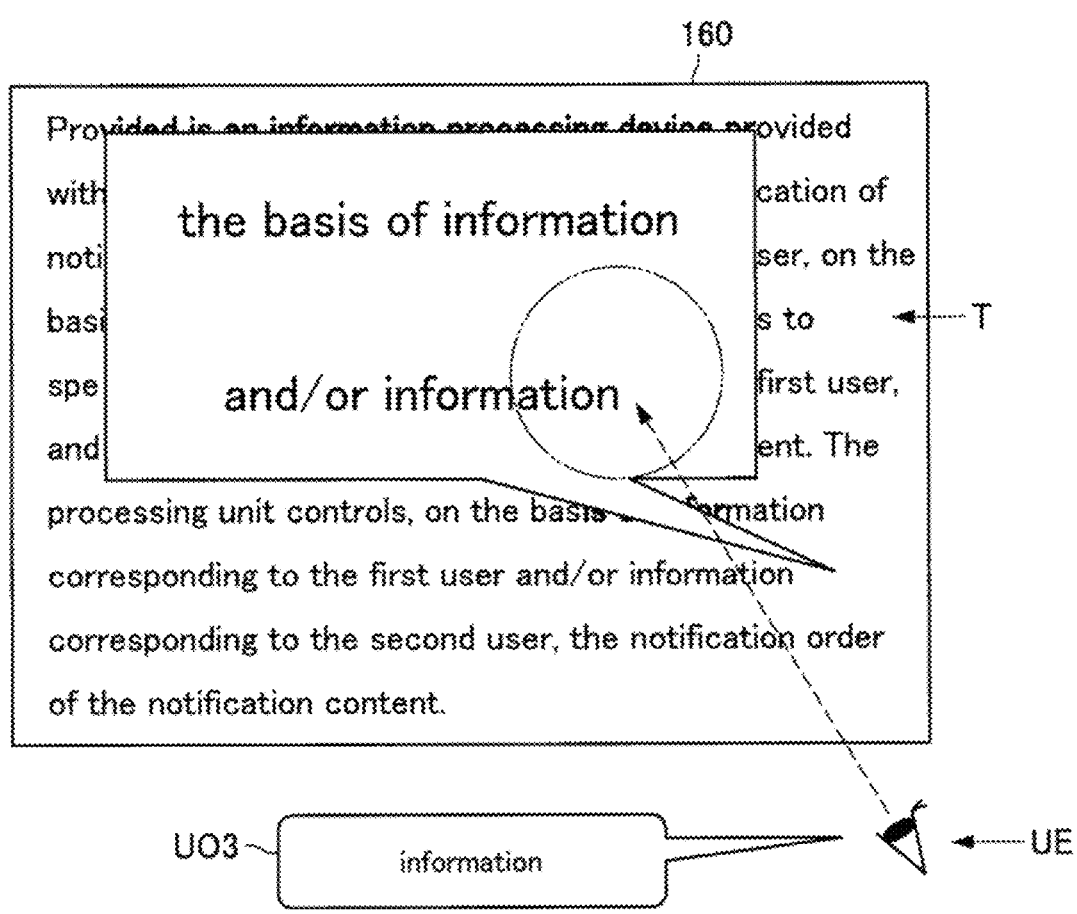
FIG. 6B is a diagram for explaining specifying a selected spot in the case where multiple subject character strings are contained in a candidate spot according to the embodiment.
Figure 6C:
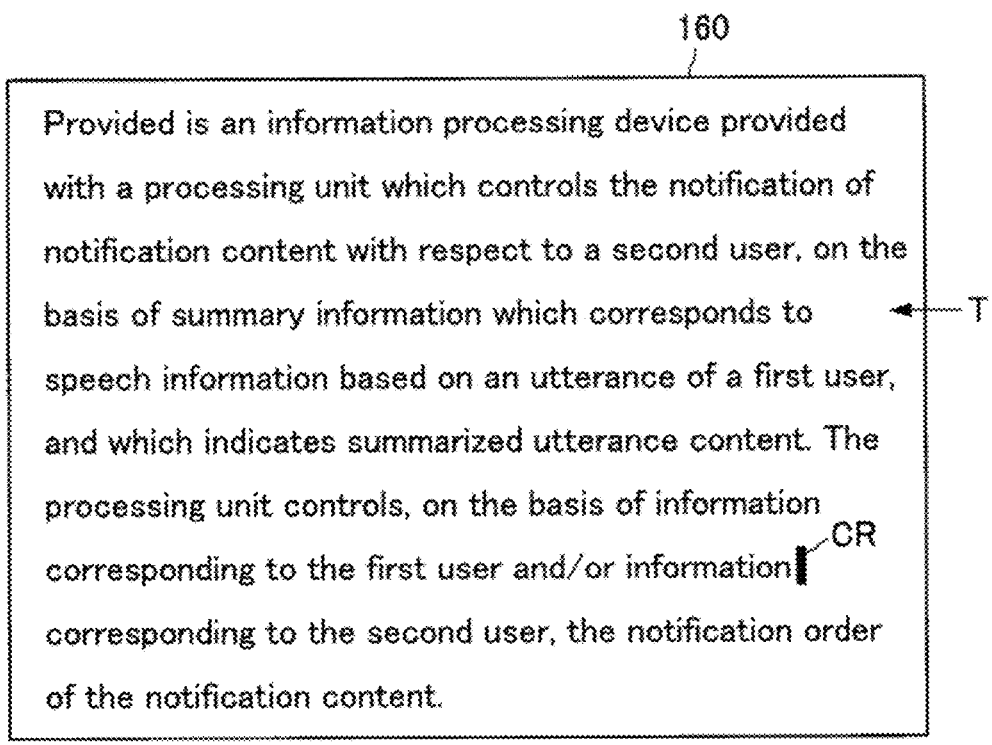
FIG. 6C is a diagram for explaining specifying a selected spot in the case where multiple subject character strings are contained in a candidate spot according to the embodiment.

The case where multiple character strings corresponding to the result of sound recognition on the speech are contained in the candidate spot is assumable here. FIGS. 6A to 6C are diagrams for explaining specifying of a selected spot in the case where multiple subject character strings are contained in a candidate spot according to the embodiment.

FIG. 6A illustrates the situation in which the user gazes a spot right after "information" at the end of the third line from the bottom and makes a speech UO2 of "information".

In this case, because two character strings corresponding to "information" are contained in the candidate spot that is defined by the specifying unit 140 based on the result of recognizing a gaze by the gaze recognition unit 240, the specifying unit 140 is unable to specify a selected spot at this stage.

As described above, when the specifying unit 140 determines that multiple subjects that can be specified from a speech of the user are contained in a candidate spot, the display controller 150 according to the embodiment may cause the display unit 160 to display the candidate spot in an enlarged manner as illustrated in FIG. 6B.

In this case, the user gazes an intended selected spot again in the candidate spot that is displayed in an enlarged manner and specifies a selected spot by making a speech UO3.

According to the above-described flow, the specifying unit 140 is able to define a second candidate spot from the enlarged candidate spot based on a gaze of the user and specify a selected spot from the second candidate spot based on a speech of the user.

FIG. 6C illustrates that the specifying unit 140 correctly specifies, as a selected spot, the spot right after "information" at the end of the third line from the bottom based on the gaze of the user on the aforementioned enlarged display.

In order to implement such a process as the above-described one, the display controller 150 according to the embodiment may cause the display unit 160 to display a candidate spot in an enlarged manner at a magnification that enables separation of multiple subjects by a gaze of the user based on a resolution relating to recognition of the gaze.

For example, in the example illustrated in FIG. 6B, the display controller 150 adjusts the increasing magnification such that "information" at the end of the third line from the bottom and "information" at the end of the fourth line from the bottom are not contained together in the gazed area that is recognized depending on the resolution.

As described above, the specifying unit 140 and the display controller 150 according to the embodiment makes it possible to, even when multiple subjects that can be specified from a speech are contained in a candidate spot, correctly specify a selected spot that is intended by a user.

Figure 7:
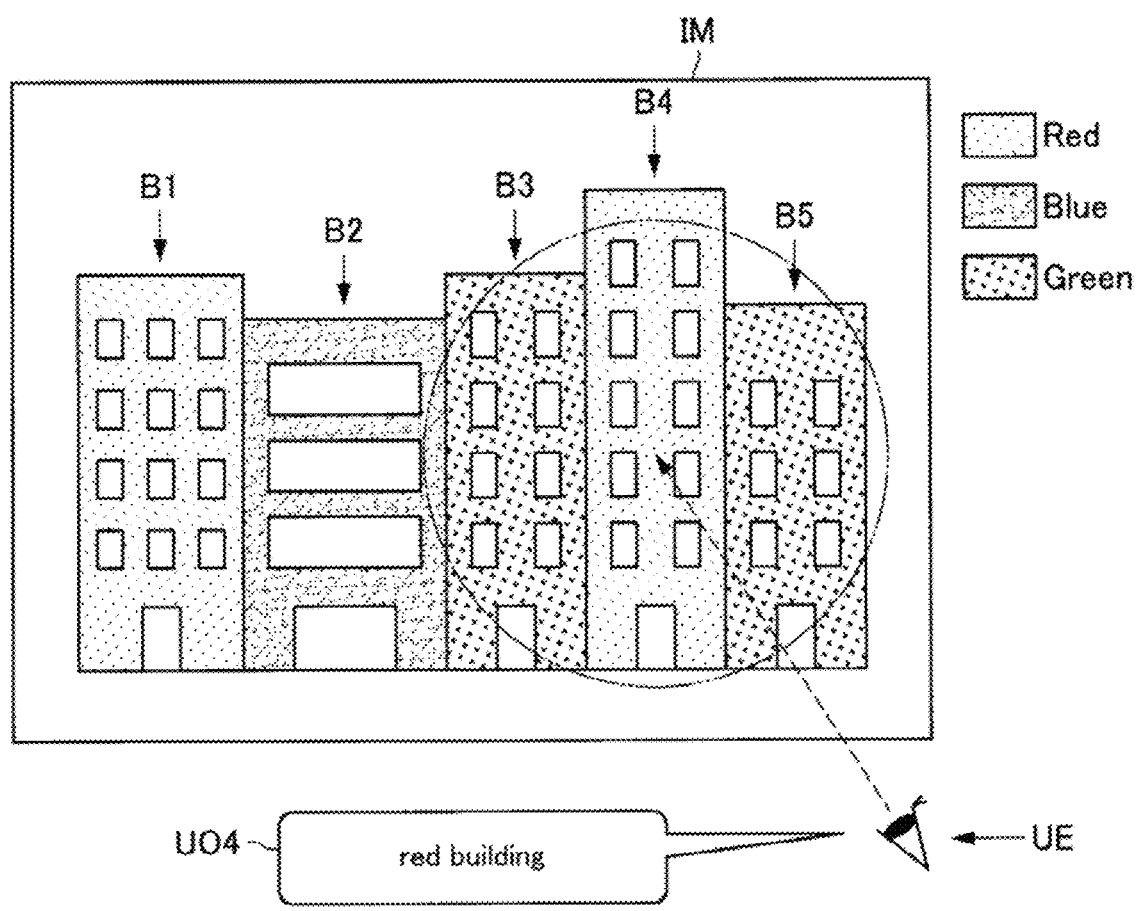
FIG. 7 is a diagram illustrating an example of the case where a specifying unit specifies a selected spot from an image based on a gaze and a speech of a user according to the embodiment.
Figure 8:
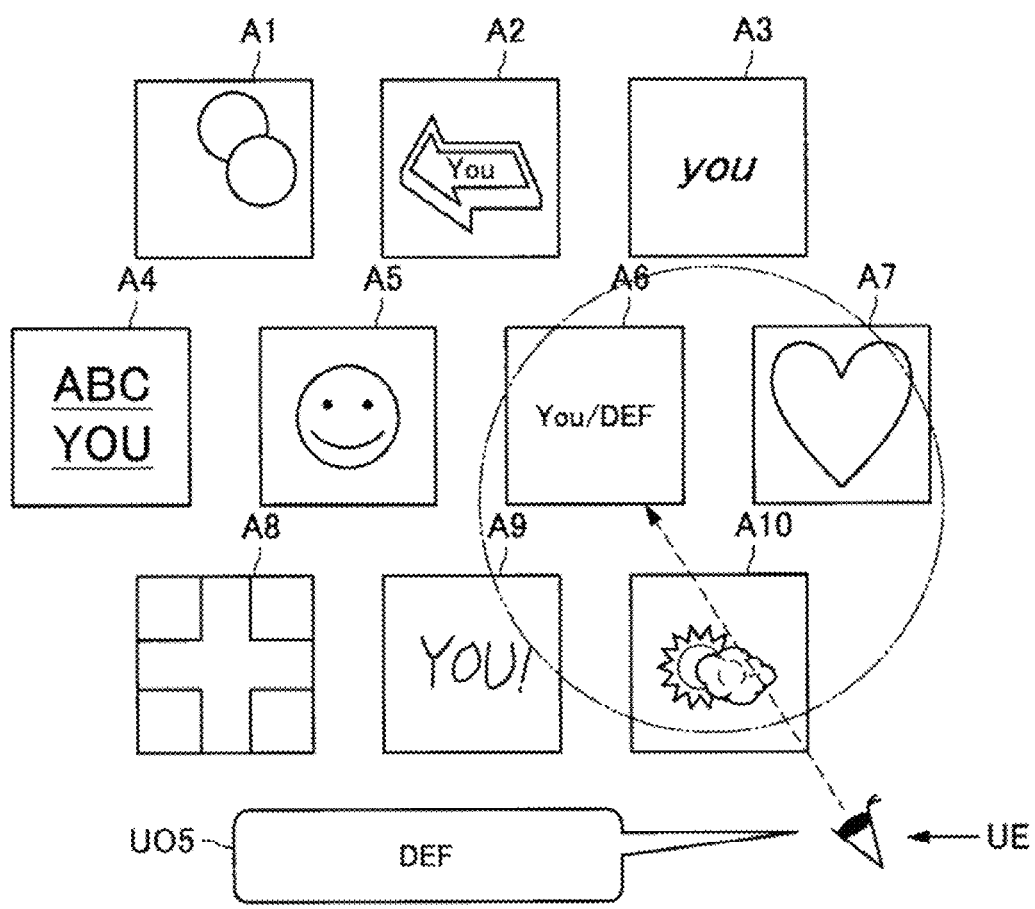
FIG. 8 is a diagram illustrating an example of the case where a specifying unit specifies a selected spot from an image based on a gaze and a speech of a user according to the embodiment.

Subsequently, an example of control in the case where the visual information according to the embodiment is an image and the selected spot is part of the image will be described. FIGS. 7 and 8 are diagrams illustrating an example of the case where the specifying unit 140 according to the embodiment specifies a selected spot from an image based on a gaze and a speech of the user.

For example, in the case of the example illustrated in FIG. 7, five buildings B1 to B5 in different colors are contained in an image IM. A user is going to mark the building B4 in the image IM and transmit the image as an image indicating a spot of meeting to another user.

In this case, as in the case of character strings, the user first of all gazes the building B4. The specifying unit 140 specifies, as a candidate spot, the gazed area that s recognized based on a resolution by the gaze recognition unit 240.

In this case, in the case of the example illustrated in FIG. 7, the three buildings B3 to B5 are contained in the candidate spot and the specifying unit 140 is able to specify, as a selected spot, the building B4 that is the only one building in red from among the three building B3 to B5 based on the result of the natural language understanding process on a speech UO4 of the user and the result of general object recognition on the image IM.

In the case of the example illustrated in FIG. 8, the user is going to select music to be played while checking multiple music images A1 to A10 that are displayed. Assume that the name of each of the sets of music corresponding to the music images A1 to A10 is "You". Also in this case, first of all, the specifying unit 140 defines, as a candidate spot, the area that is gazed by the user and that is recognized by the gaze recognition unit 240.

In this case, the three music images A6, A7 and A10 are contained in the candidate spot and, based on a result of the natural language understanding process on the speech UO5 of the user and the result of the general object recognition, the specifying unit 140 is able to specify, as a selected spot, the music image A6 that is the only one music image corresponding to the music of an artist DEF from among the three music images A6, A7 and A10.

As described above, the specifying unit 140 according to the embodiment may specify, as a selected spot, an object that matches an intention that is recognized from a speech of the user from objects contained in a candidate spot.

Figure 9:
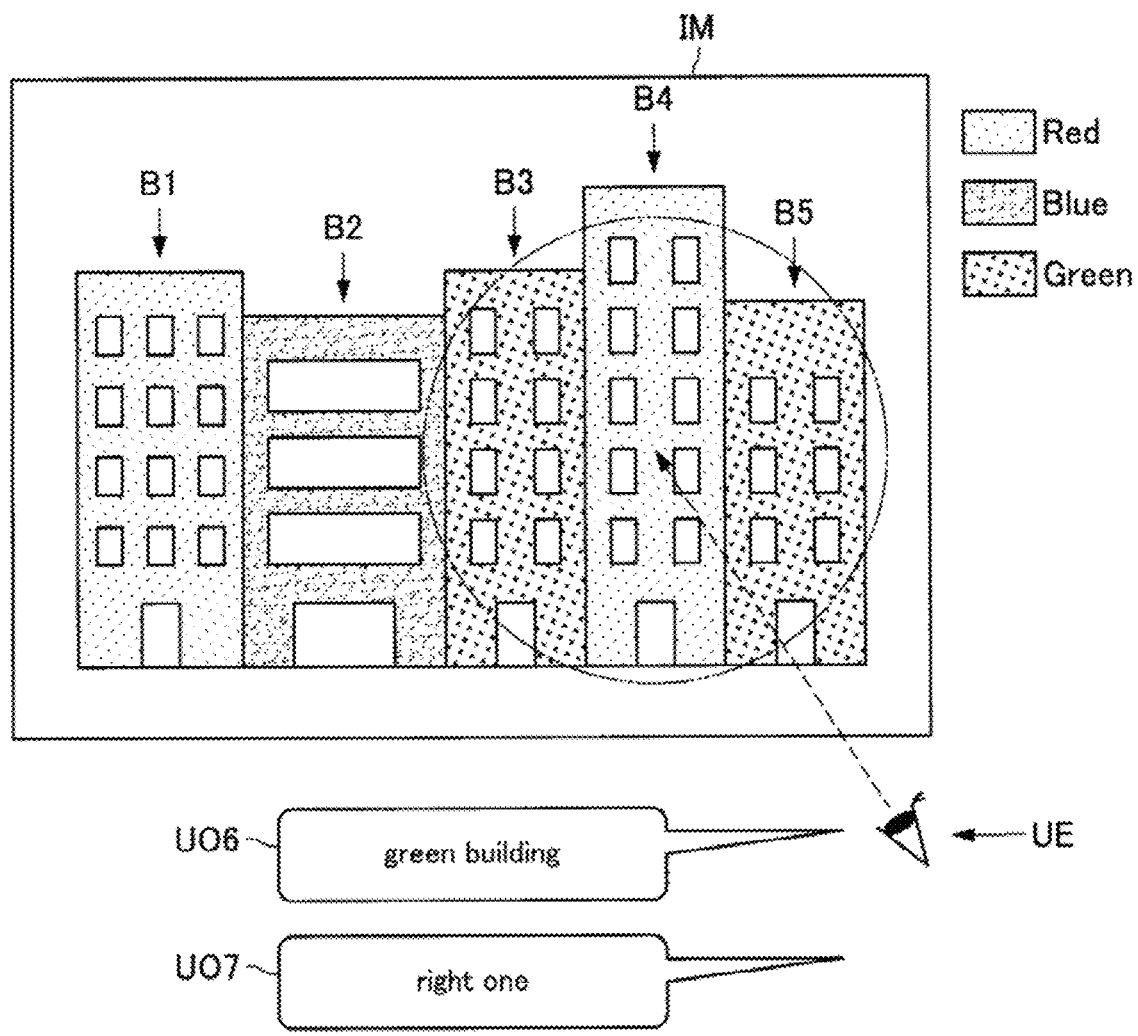
FIG. 9 is a diagram for explaining specifying a selected spot in the case where multiple subject objects are contained in a candidate spot according to the embodiment.
Figure 10:
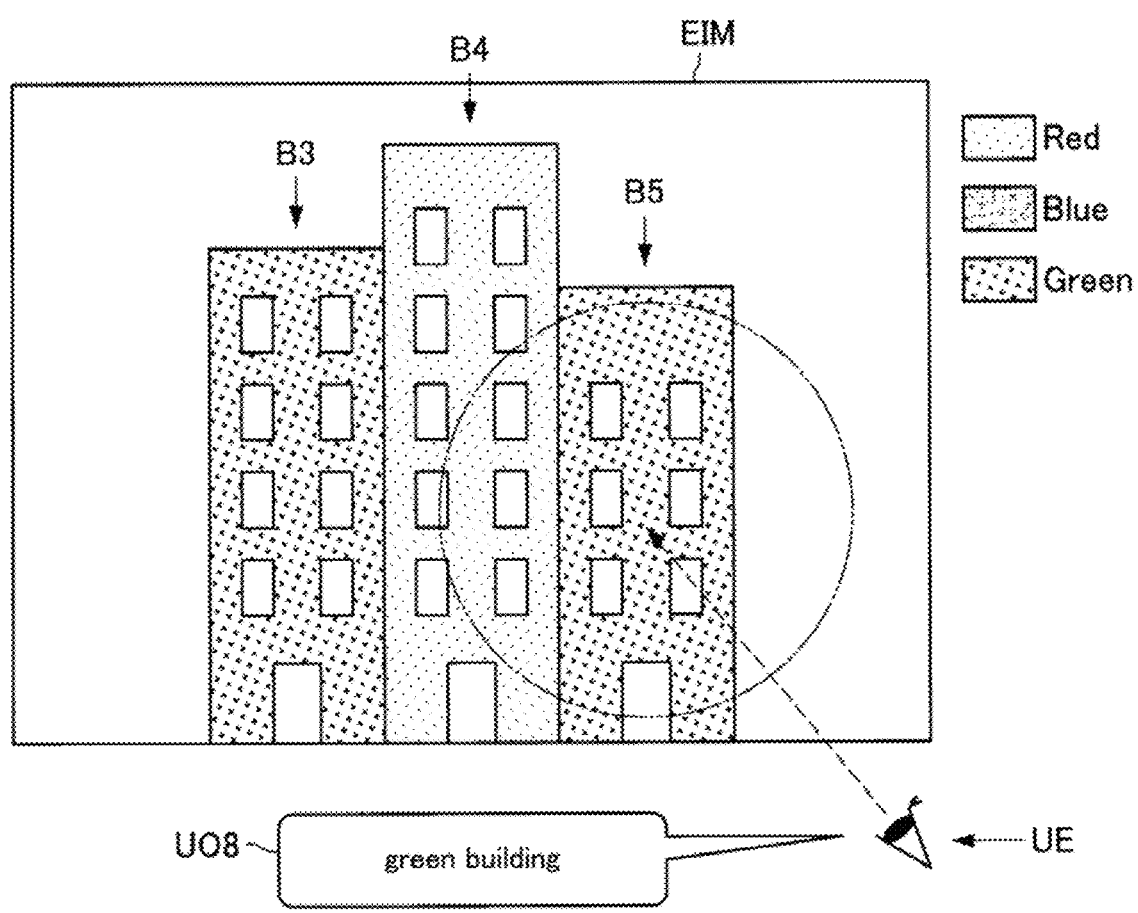
FIG. 10 is a diagram for explaining specifying a selected spot in the case where multiple subject objects are contained in a candidate spot according to the embodiment.

Also when the visual information is an image, multiple subject objects that can be specified from a speech may be contained in a candidate spot. FIG. 9 and FIG. 10 are diagrams for explaining specifying a selected spot in the case where multiple subject objects are contained in a candidate spot according to the embodiment.

For example, in the case of the example illustrated in FIG. 9, three buildings B3 to B5 are contained in a candidate spot. In this case, the specifying unit 140 is unable to specify a selected spot by only a speech UO6 that specifies a green building.

On the other hand, when the user subsequently makes a speech UO7 that specifies a building on the right, the specifying unit 140 is able to specify the building B5 as a selected spot based on the result of the natural language understanding process on the speeches UO6 and UO7. As described above, the specifying unit 140 according to the embodiment may specify a selected spot from the multiple subject objects that are contained in the candidate spot based on multiple speeches of the user.

As in the example illustrated in FIG. 9, when multiple subject objects are contained in a candidate spot, the specifying unit 140 is also able to induce a speech of the user that is helpful in specifying a selected spot by outputting a system sound of, for example, "Which one?". It is also possible to induce a speech of the user by displaying a speech guide to be described below.

As in the case of character strings, the display controller 150 may cause the display unit 160 to display the candidate spot in an enlarged manner at a magnification that enables separation of the subject objects by a gaze of the user.

For example, in the case of the example illustrated in FIG. 10, the specifying unit 140 is able to specify a second candidate spot from a result of recognizing the gaze of the user in an enlarged image EIM of the candidate spot and specify the building B5 as a selected spot from the result of natural language understanding process on a speech UO8 that specifies the green building.

Figure 11:
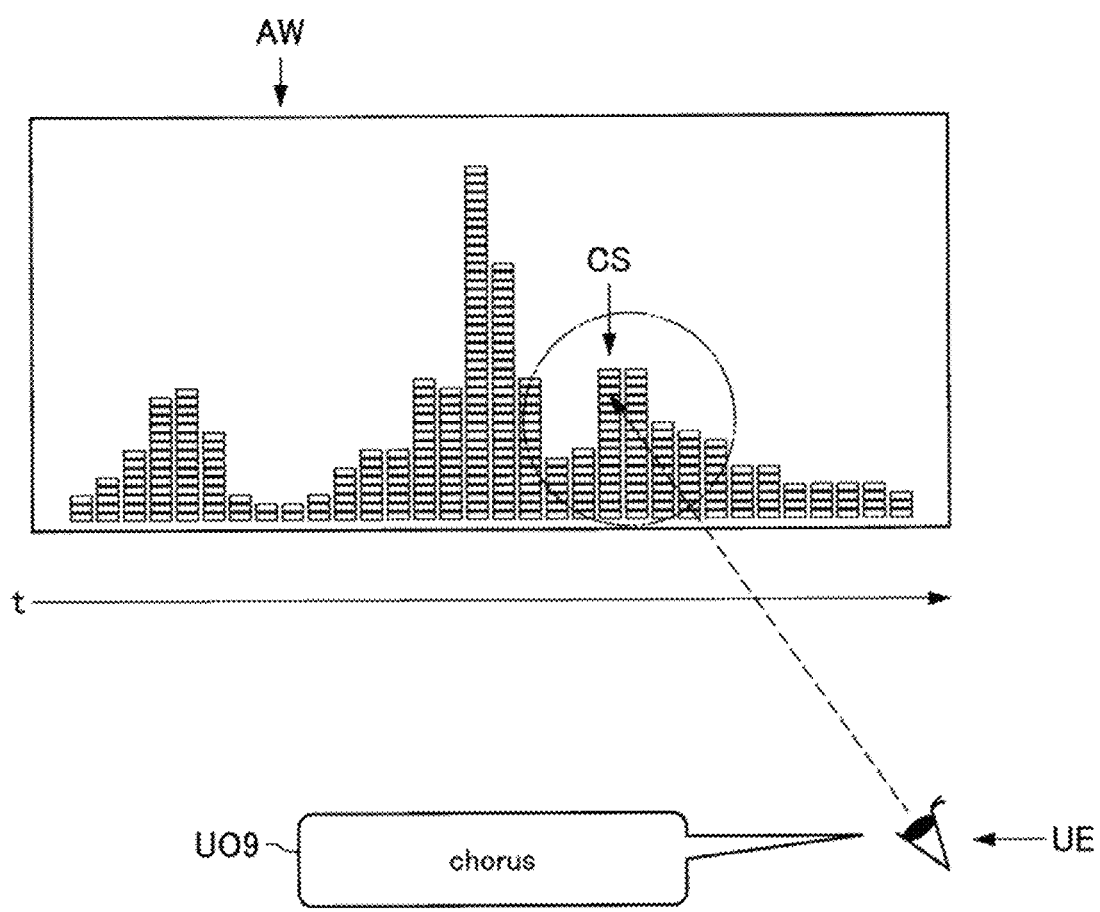
FIG. 11 is a diagram of an example of the case where a specifying unit 140 specifies a selected spot from waveform data based on a gaze and a speech of the user according to the embodiment.

Subsequently, an example of control in the case where the visual information according to the embodiment is waveform data corresponding to sensing information that is collected over time and a selected spot is part of the waveform data will be described. FIG. 11 is a diagram illustrating an example of the case where the specifying unit 140 according to the embodiment specifies a selected spot from the waveform data based on a gaze and a speech of the user.

FIG. 11 illustrates an example of the case where a user specifies a freely-selected spot in an audio waveform AW of certain music and performs evaluation tagging. In this case, the user first of all gazes a spot to be tagged in the audio waveform AW. The specifying unit 140 specifies, as a candidate spot, the gazed area that is recognized by the gaze recognition unit 240 based on a resolution.

The user then makes a speech to specify a spot to be tagged. In the example illustrated in FIG. 11, the user makes a speech UO9 that specifies a chorus part of the music. In this case, the specifying unit 140 according to the embodiment is able to specify a chorus start point CS as a selected spot by matching metadata (in the case of the example, for example, configuration information or a score of the music) and an intention that is recognized from the speech UO9.

The metadata according to the embodiment may be assigned manually or may be assigned dynamically by various recognition processes. For example, in the case of waveform data of music, a character string that is recognized by the sound recognition unit 210 can be assigned as metadata. In this case, by matching a character string that is recognized from part of a lyric that is voiced by the user and the lyric in the metadata, the specifying unit 140 is able to specify, as a selected spot, a spot corresponding to the corresponding lyric.

For example, in the case of waveform data of a video, a character string that is recognized by the sound recognition unit 210 and the result of general object recognition by the image recognition unit 230 may be assigned as metadata. In this case, the specifying unit 140, for example, is able to specify a selected spot based on a speech indicating a name of person, a name of object, or a characteristic of a scene and the above-described metadata.

The waveform data according to the embodiment widely contains, in addition to sound or a video, for example, sensing information, such as acceleration or an angular speed. The specifying unit 140 according to the embodiment makes it possible to specify a selected spot easily and accurately according to a gaze and a speech even when it is difficult to specify a selected spot from only the shape when processing waveform data, or the like.

Display control on visual information based on a profile of the user according to the embodiment will be described. The display controller 150 according to the embodiment has a function of controlling a mode of displaying visual information based on a profile of the user. For example, the display controller 150 is able to cause the display unit 160 to display visual information in a display mode suitable to each user based on the characteristic of the user that is represented by the profile of the user.

Figure 12:
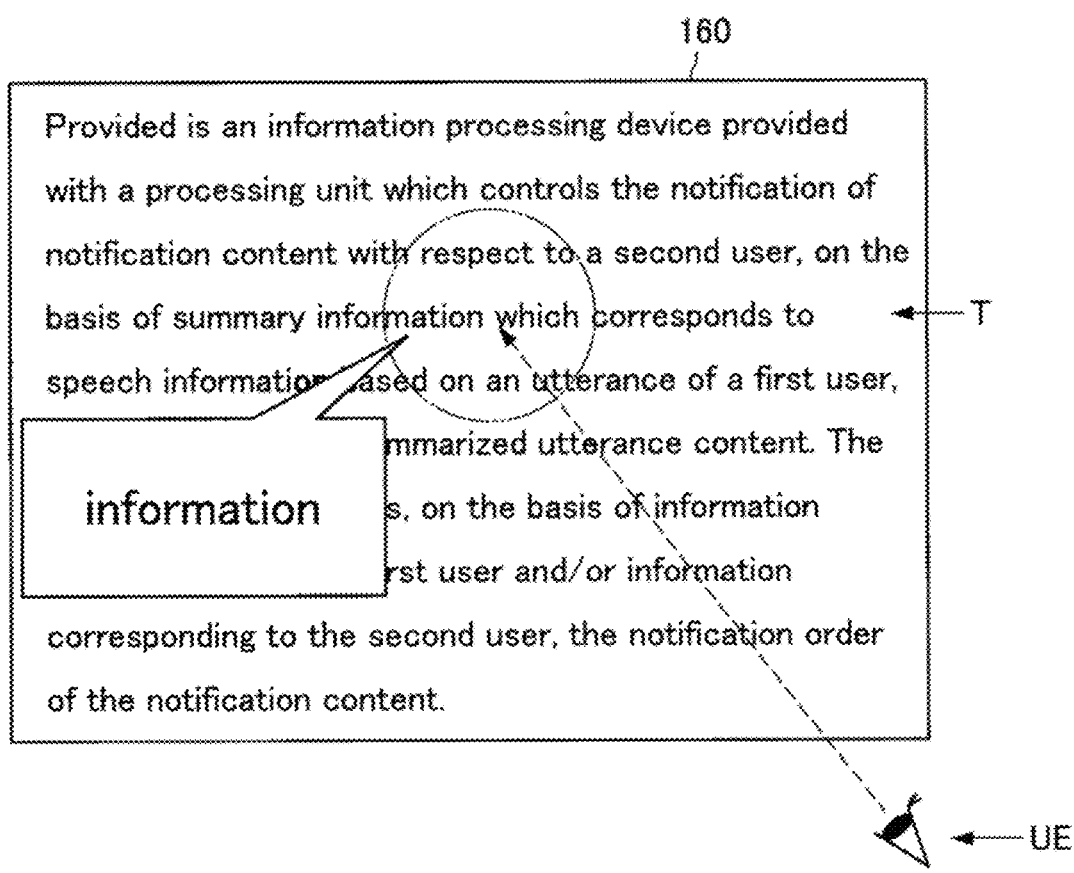
FIG. 12 is a diagram for explaining control on the mode of displaying visual information based on a visual characteristic according to the embodiment.
Figure 13:
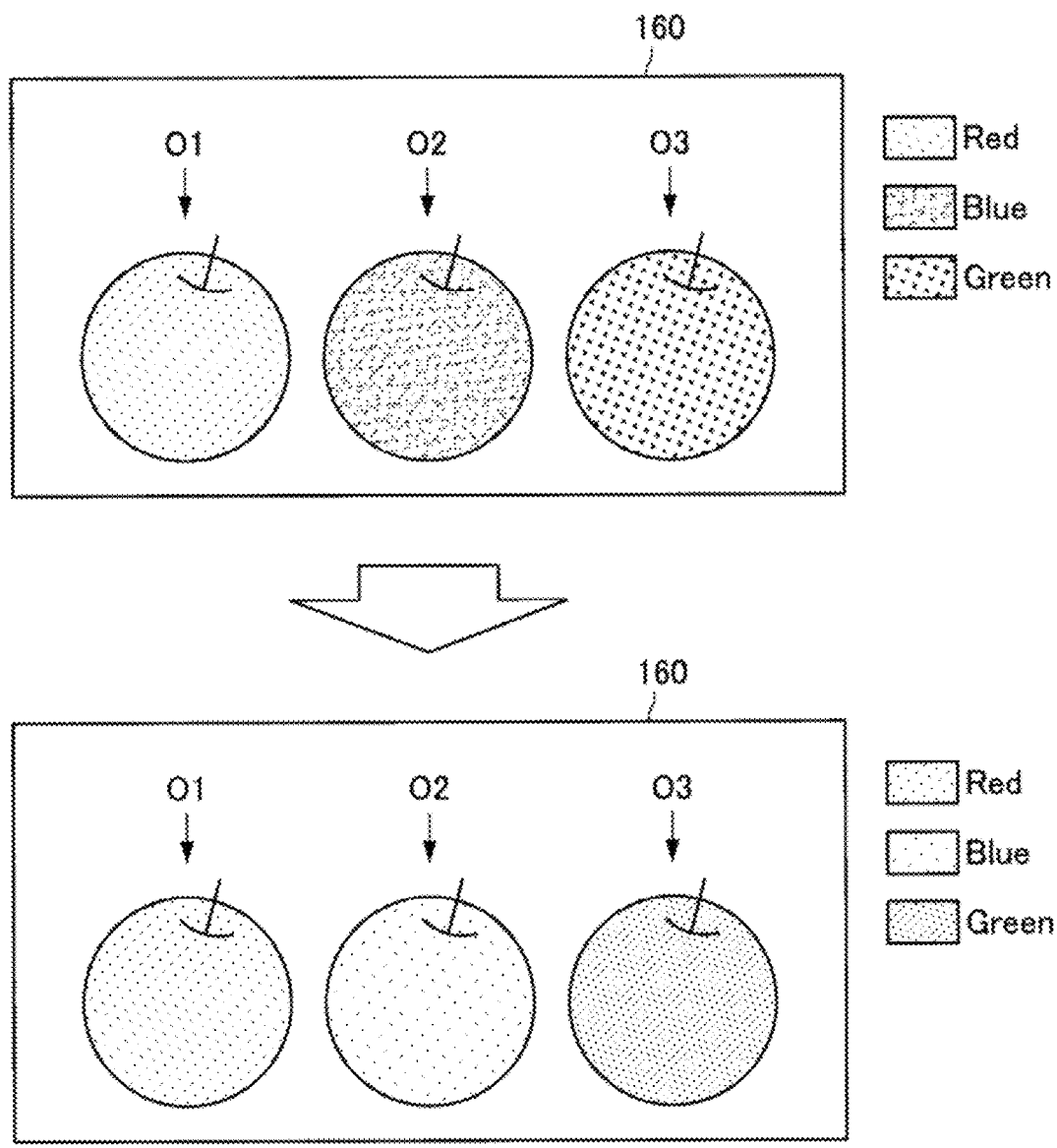
FIG. 13 is a diagram for explaining control on the mode of displaying visual information based on a visual characteristic according to the embodiment.

The profile of the user according to the embodiment contains a visual characteristic of the user. FIGS. 12 and 13 are diagrams for explaining control on the mode of displaying visual information based on the visual characteristic according to the embodiment.

For example, FIG. 12 illustrates an example of the control on the display mode control in the case where the user has a visual characteristic in having difficulty in viewing the center, such as a macular hole or age-related macular degeneration.

In the case where the profile of the user indicates such a visual characteristic as that described above, when a character string that is specified from a speech is contained in a candidate spot, as illustrated in the drawing, the display controller 15 may display the character string in an enlarged manner in a position deviating from the central area of vision, such as one around the candidate spot.

For example, FIG. 13 illustrates an example of the display mode control in the case where the user has abnormality in color vision. In FIG. 13, the chain double-dashed line indicating a candidate spot is omitted and it is assumed that three objects O1 to O3 are contained in the candidate spot in FIG. 13.

As illustrated in the upper diagram in FIG. 13, when multiple objects O1 to O3 in different colors are contained in a candidate spot, the user is unable to recognize differences in color and has difficulty in specifying a freely-selected object O by making a speech.

In this case, the display controller 150 according to the embodiment, for example, as illustrated in the lower diagram, the display controller 150 according to the embodiment processes the objects O1 to O3 and, for example, performs control such that the objects O1 to O3 are distinguishable by gradations of the same color.

The above-described control by the display controller 150 according to the embodiment enables the user to specify the object O3 by making a speech of "the darkest apple", or the like.

Figure 14:
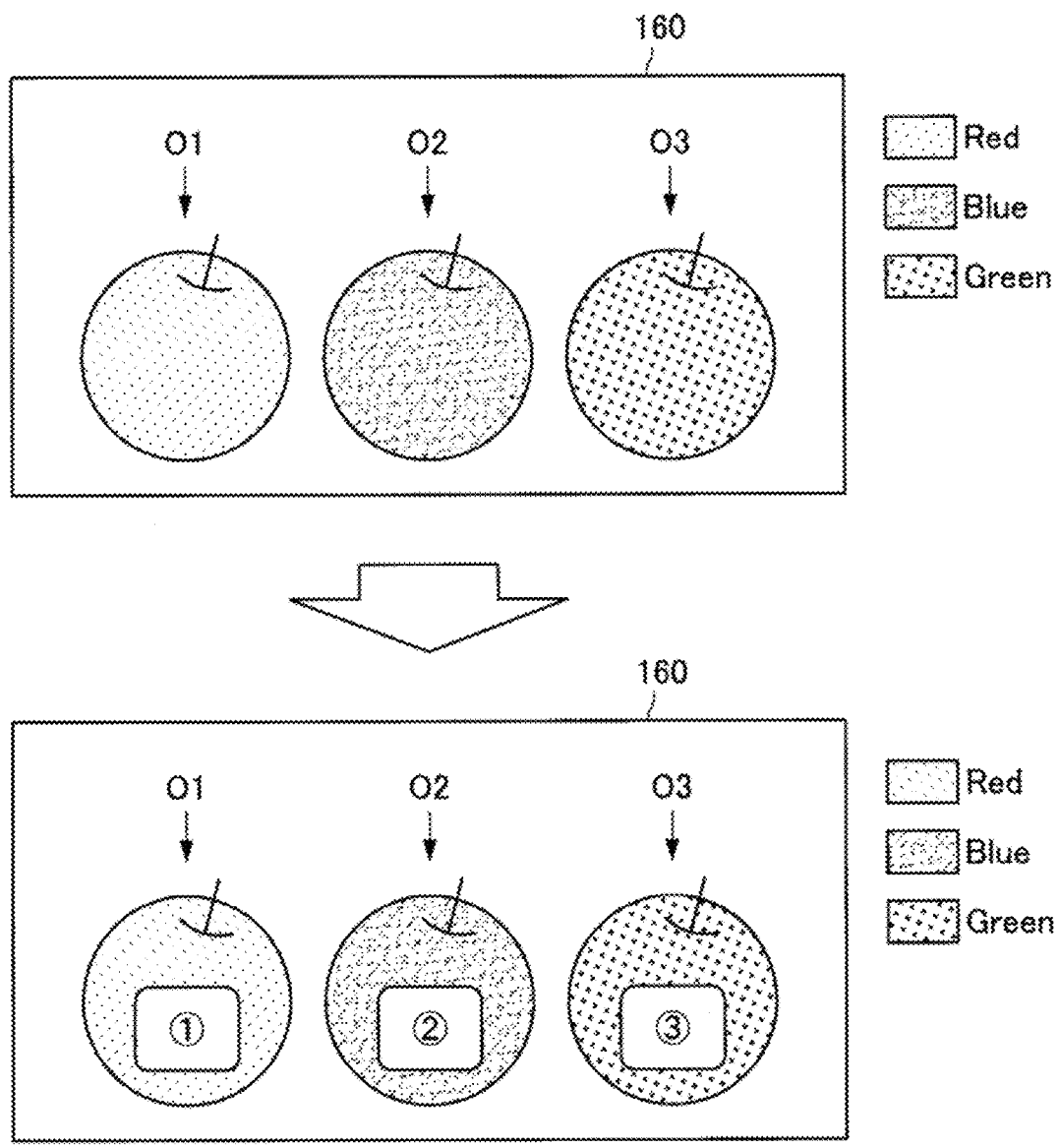
FIG. 14 is a diagram for explaining speech guides according to the embodiment.

The display controller 150 according to the embodiment may assist specifying a selected spot according to a speech of the user by assigning speech guides to the visual information. FIG. 14 is a diagram for explaining the speech guide according to the embodiment. The speech guide according to the embodiment may be various types of information that induce the user to make a speech for specifying a selected spot.

In FIG. 14, an example of display mode control in the case where the user has abnormality in color vision is illustrated as in FIG. 13. The chain double-dashed line representing the candidate spot is omitted also in FIG. 4 and, as in FIG. 13, it is assumed that three objects O1 to O3 are contained in the candidate spot.

As illustrated in the upper drawing in FIG. 14, when the objects O1 to O3 in different color are contained, the user is unable to recognize differences in color and has difficulty in specifying a freely-selected object O by making a speech.

As described above, when the specifying unit 140 determines that multiple subjects are contained in the candidate spot, the display controller 150 according to the embodiment causes the display unit 160 to display the subjects in association with different speech guides, respectively.

In the case of the example illustrated in the lower drawing in FIG. 14, the display controller 150 associates numbers "1" to "3" as speech guides with the respective objects O1 to O3. Such control enables the user to specify a freely-selected object O easily by making a speech of a number. In this case, the specifying unit 140 according to the embodiment may specify, as a selected spot, a subject that is associated with a speech guide corresponding to the speech of the user.

In FIG. 14, the example of the case where the user has a special visual characteristic has been described; however, the display controller 150 according to the embodiment may associate speech guides with various types of visual information without depending on the profile of the user. The speech guide according to the embodiment are significantly effective in specifying a selected spot in character strings, an image or waveform data.

1.6. Flow of Process

Figure 15:
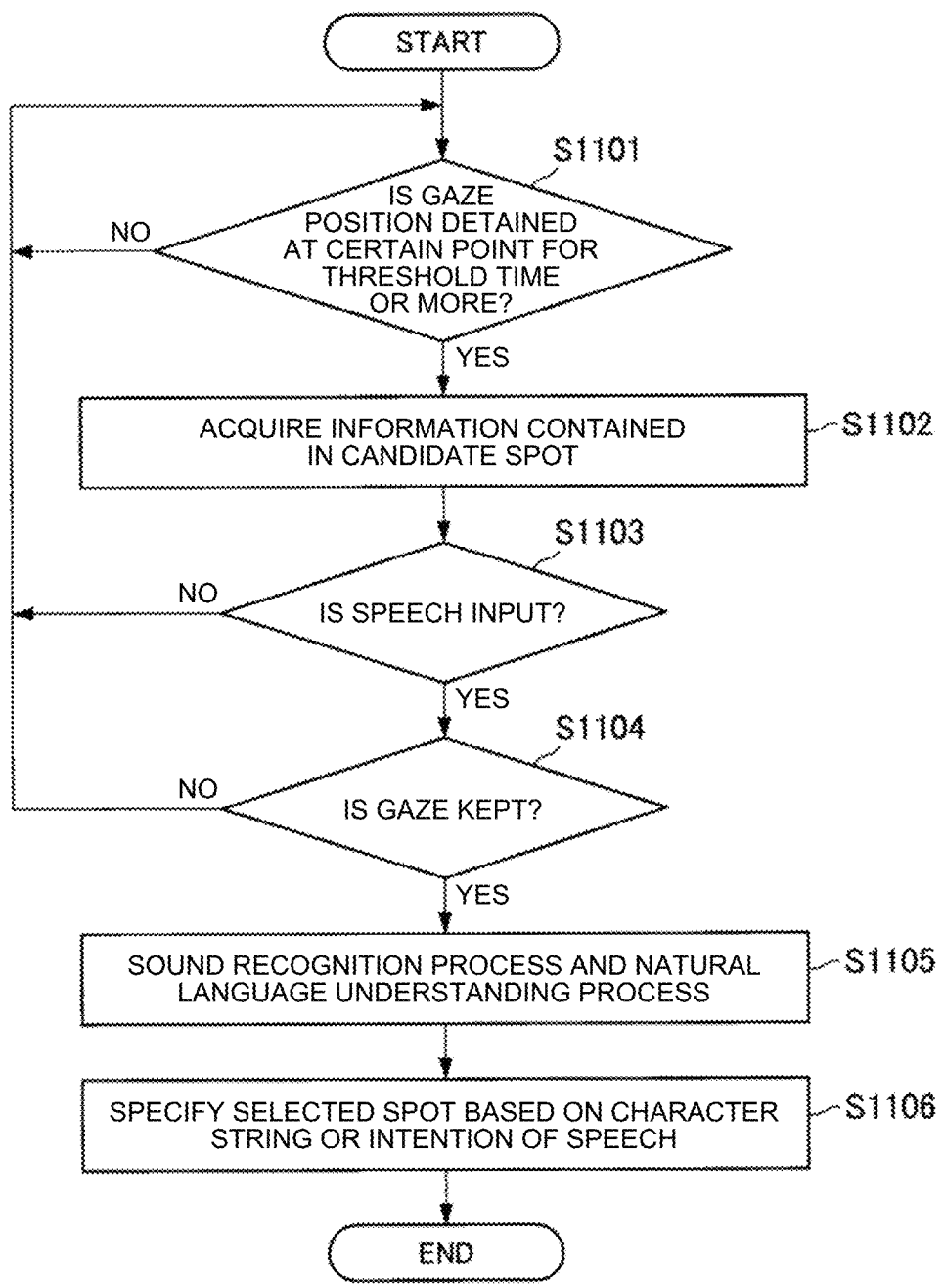
FIG. 15 is a flowchart illustrating a flow of a process performed by the information processing system according to the embodiment.

A flow of a process performed by the information processing system according to the embodiment will be described in detail next. FIG. 15 is a flowchart illustrating the flow of the process performed by the information processing system according to the embodiment.

Referring to FIG. 15, first of all, based on eyeball images of a user, the gaze recognition unit 240 determines whether a gaze position of the user is detained at a certain point for a threshold time or more (S1101).

When detention of the gaze position for the threshold time or more is not found (NO at step S1101), the information processing system returns to step S1101.

When detention of the gaze position for the threshold time or more is found (YES at step S1101), the specifying unit 140 regards the point where the detention is found as a candidate spot and acquires information contained in the candidate spot (step S1102).

The sound recognition unit 210 determines whether a speech of the user is input (S1103).

The gaze recognition unit 240 determines whether the gaze of the user is maintained (S1104).

When a speech is not input (NO at step S1103) or the gaze of the user is not kept (NO at step S1104), the information processing system returns to step S1101.

On the other hand, when a speech is input (YES at step S1103) and the gaze of the user is kept (YES at step S1104), the sound recognition unit 210 and the natural language processor 220 execute the automatic sound recognition process and the natural language understanding process (S1105).

The specifying unit 140 then specifies a selected spot from the candidate spot based on a character string that is obtained by the automatic sound recognition process or the intention of the speech that is acquired by the natural language understanding process at step S1105 (S1106).

2. Example of Hardware Configuration

Figure 16:
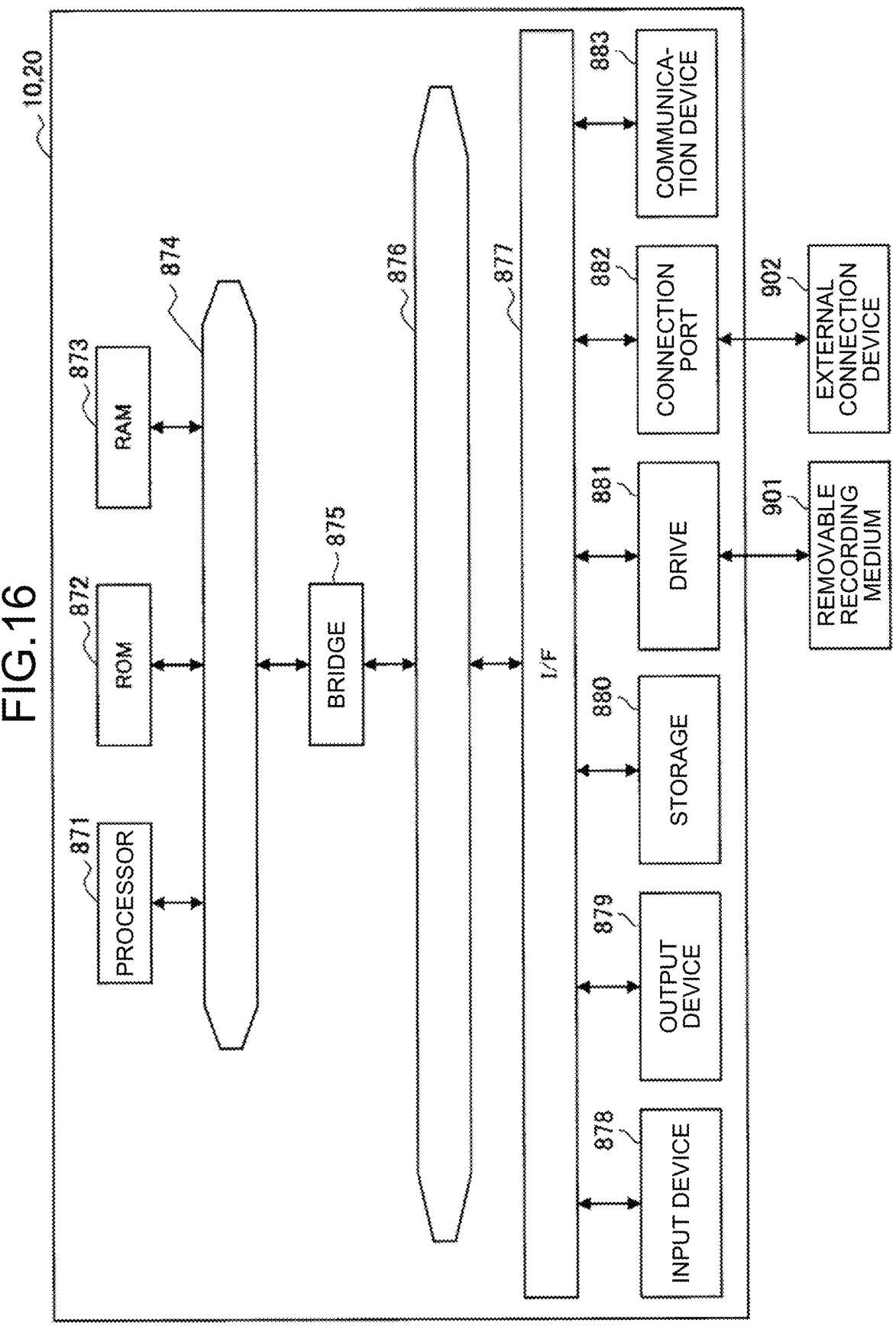
FIG. 16 is a diagram illustrating an example of a hardware configuration according to an embodiment of the disclosure.

An example of a hardware configuration that is common between the information processing terminal device 10 and the information processing server 20 according to an embodiment of the disclosure will be described. FIG. 16 is a block diagram illustrating the example of the hardware configuration of the information processing terminal device 10 and the information processing server 20 according to the embodiment of the disclosure. As illustrated in FIG. 16, the information processing terminal device 10 and the information processing server 20, for example, include a processor 871, a ROM 872, a RAM 873, a host bus 874, a bridge 875, an external bus 876, an interface 877, an input device 878, an output device 879, a storage 880, a drive 881, a connection port 882, and a communication device 883. The hardware configuration illustrated herein is an example and the components may be partly omitted. Components other than the components illustrated herein may be further included.

Processor 871

The processor 871, for example, functions as an arithmetic processor or a control device and controls general or part of operations of each component according to various programs that are recorded in the ROM 872, the RAM 873, the storage 880 or a removable recording medium 901.

ROM 872 and RAM 873

The ROM 872 is a unit that stores programs to be loaded in the processor 871 and data to be used for computation, etc. In the RAM 873, for example, programs to be loaded in the processor 871 and various parameters that vary as appropriate when the programs are executed, etc., are stored temporarily or permanently.

Host Bus 874, Bridge 75, External Bus 876 and Interface 877

The processor 871, the ROM 872 and the RAM 873, for example, are connected to one another via the host bus 874 enabling high-rate data transmission. On the other hand, the host bus 874 is, for example, connected to the external bus 876 in which the data transmission rate is relatively low via the bridge 875. The external bus 876 is connected to various components via the interface 877.

Input Device 878

For example, a mouse, a keyboard, a touch panel, a button, a switch, a lever, etc., are used for the input device 878. Furthermore, a remote controller (hereinafter, remote) capable of transmitting a control signal, using infrared rays or other radio waves, may be used as the input device 878. The input device 878 also includes an audio input device, such as a microphone.

Output Device 879

The output device 879 is, for example, a device capable of visually or auditorily notifying a user of acquired information, such as a display device like a cathode ray tube (CRT), a LCD or an organic EL display, an audio output device like a speaker or headphones, a printer, a mobile phone, or a facsimile machine. The output device 879 according to the disclosure includes various vibration devices capable of outputting tactile stimulation.

Storage 880

The storage 880 is a device for storing various types of data. For example, a magnetic storage device, such as a hard disk drive (HDD), a semiconductor storage device, an optical storage device, a magneto-optical storage device, or the like, may be used as the storage 880.

Drive 881

The drive 881 is, for example, a device that reads information that is recorded in the removable recording medium 901, such as a magnetic disk, an optical disk, a magneto-optical disk or a semiconductor memory, or writes information in the removable recording medium 901.

Removable Recording Medium 901

The removable recording medium 901 is, for example, a DVD medium, a Blu-ray (trademark) medium, a HD DVD medium, or various types of semiconductor storage media. As a matter of course, the removable recording medium 901 may be, for example, an IC card on which a non-contact IC chip is mounted, or an electric device.

Connection Port 882

The connection port 882 is, for example, a port for connecting an external connection device 902, such as a USB (Universal Serial Bus) port, an IEEE1394 port, a SCSI (Small Computer System Interface), a RS-232C port or an optical audio terminal.

External Connection Device 902

The external connection device 902 is, for example, a printer, a portable music player, a digital camera, a digital video camera or an IC recorder.

Communication Device 883

The communication device 883 is a communication device for connecting to a network and is, for example, a wired or wireless LAN, a communication card for Bluetooth (trademark) or WUSB (Wireless USB), a router for optical communication, a router for ADSL (Asymmetric Digital Subscriber Line), or a modem for various types of communication.

3. Summary

As described above, the information processing terminal device 10 according to the embodiment of the disclosure includes the specifying unit 140 that specifies, based on a speech and a behavior, a selected spot intended by a user from visual information that is displayed. The specifying unit 140 according to the embodiment of the disclosure has a characteristic in specifying the selected spot based on a non-verbal action and a verbal action. The configuration makes it possible to specify a selected spot intended by the user more accurately.

The preferable embodiments of the disclosure has been described in detail with reference to the accompanying drawings; however, the technical scope of the disclosure is not limited to the examples. It is obvious that those with general knowledge in the technical field of the disclosure can reach various modification examples or correction examples within the scope of technical idea described in the claims and it is understood that they naturally belong to the technical scope of the disclosure.

The effect disclosed herein is explanatory and exemplary only and thus are not definitive. In other words, the technique according to the disclosure can achieve, together with the above-described effect or instead of the above-described effect, another effect obvious to those skilled in the art from the description herein.

It is also possible to create a program for causing hardware, such as a CPU, a ROM, or a RAM, that is incorporated in a computer to implement a function equivalent to the configuration of the information processing terminal device 10 and a non-transitory computer-readable recording medium in which the program is recorded can be provided.

Each step of the processes performed by the information processing terminal device 10 herein need not necessarily be processed chronologically in the order illustrated in the flowcharts. For example, each step according to the processes performed by the information processing server 20 may be processed in an order different from that illustrated in the flowchart or may be processed parallelly.

The following configuration also belongs to the technical scope of the disclosure.

(1)

An information processing device comprising:
a specifying unit configured to, based on a speech of a user, specify a selected spot that is intended by the user from visual information that is displayed,
wherein the specifying unit is configured to specify the selected spot based on a non-verbal action and a verbal action of the user.

(2)

The information processing device according to (1), wherein the non-verbal action contains at least an ocular motion of the user, and
the specifying unit is configured to specify the selected spot based on a gaze of the user and the verbal action.

(3)

The information processing device according to (2), wherein the verbal action contains at least a speech of the user, and
the specifying unit is configured to specify the selected spot based on the gaze of the user and the speech.

(4)

The information processing device according to (3), wherein the specifying unit is configured to define a candidate spot from the visual information based on any one of the gaze and the speech of the user and, based on the other, specify the selected spot from the candidate spot.

(5)

The information processing device according to (4), wherein the specifying unit is configured to define a single candidate spot from the visual information based on the gaze of the user and specify the selected spot from the candidate spot based on the speech of the user.

(6)

The information processing device according to (5), wherein the specifying unit is configured to determine, as the candidate spot, a gazed area that is determined based on the gaze of the user and a resolution that relates to gaze recognition.

(7)

The information processing device according to (5) or (6), wherein the specifying unit is configured to specify the selected spot from the candidate spot based on a character string or an intention that is recognized from the speech of the user.

(8)

The information processing device according to any one of (5) to (7), wherein the visual information contains at least a character string, and the specifying unit is configured to specify the selected spot by matching a character string that is contained in the candidate spot and a character string that is recognized from the speech of the user.

(9)

The information processing device according to any one of (5) to (8), wherein the visual information contains at least an image and the specifying unit is configured to specify, as the selected spot, an object that matches an intention that is recognized from the speech of the user from among objects that are contained in the candidate spot.

(10)

The information processing device according to any one of (5) to (9), wherein the visual information contains at least waveform data, and the specifying unit is configured to specify the selected spot by matching metadata corresponding to the candidate spot and a character string or an intention that is recognized from the speech of the user.

(11)

The information processing device according to any one of (5) to (10), further comprising a display controller configured to display the visual information.

(12)

The information processing device according to (11), wherein the display controller is configured to display the candidate spot in an enlarged manner when the specifying unit determines that multiple subjects that can be specified from the speech of the user are contained in the candidate spot.

(13)

The information processing device according to (12), wherein the display controller is configured to, based on a resolution that relates to gaze recognition, display the candidate spot in an enlarged manner at a magnitude that enables separation of the subjects by the gaze of the user.

(14)

The information processing device according to (13), wherein the specifying unit is configure to define a second candidate spot based on the gaze of the user from the enlarged candidate spot and specify the selected spot from the second candidate spot based on the speech of the user.

(15)

The information processing device according to (12), wherein the display controller is configured to, when the specifying unit determines that multiple subjects are contained in the candidate spot, display the subjects in association with different speech guides, respectively.

(16)

The information processing device according to (15), wherein the specifying unit is configured to specify, as the selected spot, the subject that is associated with the speech guide corresponding to the speech of the user.

(17)

The information processing device according to any one of (11) to (16), wherein the display controller is configured to control a mode of displaying the visual information based on a profile of the user.

(18)

The information processing device according to (17), wherein the profile of the user contains at least a visual characteristic of the user, and the display controller is configured to display the visual information in a display mode corresponding to the visual characteristic of the user.

(19)

The information processing device according to (4), wherein the specifying unit is configured to define multiple candidate spots from the visual information based on the speech of the user and, based on the gaze of the user, specify the selected spot from the candidate spots.

(20)

An information processing method comprising:

by a processor, based on a speech of a user, specifying a selected spot that is intended by the user from visual information that is displayed, wherein the specifying includes specifying the selected spot based on a non-verbal action and a verbal action of the user.

REFERENCE SIGNS LIST

10 INFORMATION PROCESSING TERMINAL DEVICE
110 AUDIO INPUT UNIT
120 IMAGING UNIT
130 OPERATION INPUT UNIT
140 SPECIFYING UNIT
150 DISPLAY CONTROLLER
160 DISPLAY UNIT
170 SERVER COMMUNICATION UNIT
20 INFORMATION PROCESSING SERVER
210 SOUND RECOGNITION UNIT
220 NATURAL LANGUAGE PROCESSOR
230 IMAGE RECOGNITION UNIT
240 GAZE RECOGNITION UNIT
250 TERMINAL DEVICE COMMUNICATION UNIT

The invention claimed is:

1. An information processing device comprising:
circuitry configured to:
display visual information to a user;
define a candidate spot from the visual information based on a gaze of the user;
when a determination is made that multiple subjects are contained in the candidate spot, display the candidate spot in an enlarged manner and display the subjects in association with different speech guides, respectively; and
based on a speech of the user, specify a selected spot from the candidate spot that is intended by the user.

2. The information processing device according to claim 1, wherein the gaze of the user contains at least an ocular motion of the user.

3. The information processing device according to claim 1, wherein the circuitry is configured to determine, as the candidate spot, a gazed area that is determined based on the gaze of the user and a resolution that relates to gaze recognition.

4. The information processing device according to claim 1, wherein the circuitry is configured to specify the selected spot from the candidate spot based on a character string or an intention that is recognized from the speech of the user.

5. The information processing device according to claim 1, wherein the visual information contains at least a character string, and the circuitry is configured to specify the selected spot by matching a character string that is contained in the candidate spot and a character string that is recognized from the speech of the user.

6. The information processing device according to claim 1, wherein the visual information contains at least an image, and
the circuitry is configured to specify, as the selected spot, an object that matches an intention that is recognized from the speech of the user from among objects that are contained in the candidate spot.

7. The information processing device according to claim 1, wherein the visual information contains at least waveform data, and
the circuitry is configured to specify the selected spot by matching metadata corresponding to the candidate spot and a character string or an intention that is recognized from the speech of the user.

8. The information processing device according to claim 2, wherein the circuitry is configured to, based on a resolution that relates to gaze recognition, display the candidate spot in an enlarged manner at a magnitude that enables separation of the subjects by the gaze of the user.

9. The information processing device according to claim 8, wherein the circuitry is configured to define a second candidate spot based on the gaze of the user from the enlarged candidate spot and specify the selected spot from the second candidate spot based on the speech of the user.

10. The information processing device according to claim 1, wherein the circuitry is configured to specify, as the selected spot, the subject that is associated with the speech guide corresponding to the speech of the user.

11. The information processing device according to claim 2, wherein the circuitry is configured to control a mode of displaying the visual information based on a profile of the user.

12. The information processing device according to claim 11, wherein the profile of the user contains at least a visual characteristic of the user, and
the circuitry is configured to display the visual information in a display mode corresponding to the visual characteristic of the user.

13. The information processing device according to claim 1, wherein the circuitry is configured to define multiple candidate spots from the visual information based on the speech of the user and, based on the gaze of the user, specify the selected spot from the candidate spots.

14. An information processing method comprising:
displaying visual information to a user;
defining a candidate spot from the visual information based on a gaze of the user;
when a determination is made that multiple subjects are contained in the candidate spot, displaying the candidate spot in an enlarged manner and displaying the subjects in association with different speech guides, respectively; and
by a processor, based on a speech of the user, specifying a selected spot from the candidate spot that is intended by the user.

15. The information processing method of claim 14, further comprising:
specifying, as the selected spot, the subject that is associated with the speech guide corresponding to the speech of the user.

* * * * *